(12) United States Patent
Osborne et al.

(10) Patent No.: US 7,988,101 B2
(45) Date of Patent: Aug. 2, 2011

(54) AIRFOIL TRAILING EDGE PLASMA FLOW CONTROL APPARATUS AND METHOD

(75) Inventors: Bradley Alan Osborne, Manchester, MO (US); Christopher Daniel Wilson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 831 days.

(21) Appl. No.: 11/753,857

(22) Filed: May 25, 2007

(65) Prior Publication Data
US 2009/0212164 A1   Aug. 27, 2009

(51) Int. Cl.
*B64C 23/00* (2006.01)
(52) U.S. Cl. ........................ 244/205; 244/75.1
(58) Field of Classification Search .................. 244/205, 244/198, 207, 75.1
See application file for complete search history.

(56) References Cited

U.S. PATENT DOCUMENTS

| | | | | |
|---|---|---|---|---|
| 2,946,541 A | * | 7/1960 | Boyd | 244/205 |
| 3,066,894 A | * | 12/1962 | Davidson | 244/207 |
| 3,224,375 A | * | 12/1965 | Hoff | 244/205 |
| 4,014,168 A | * | 3/1977 | Carpenter | 60/202 |
| 4,398,687 A | * | 8/1983 | Nichols et al. | 244/207 |
| 5,320,309 A | * | 6/1994 | Nosenchuck et al. | 244/205 |
| 6,247,671 B1 | * | 6/2001 | Saeks et al. | 244/205 |
| 6,570,333 B1 | | 5/2003 | Miller | |
| 6,805,325 B1 | * | 10/2004 | Malmuth et al. | 244/205 |

FOREIGN PATENT DOCUMENTS

| | | |
|---|---|---|
| EP | 1619118 | 1/2006 |
| EP | 1926353 | 5/2008 |
| EP | 1936116 | 6/2008 |
| WO | WO02/081303 | 10/2002 |
| WO | WO2007133239 | 11/2007 |

OTHER PUBLICATIONS

Roth, J. Reece. University of Tennessee Plasma Sciences Laboratory, Final Report Grant AF F49620-01-1-0425 (ROTH)—"An Investigation of Flow Acceleration and Electromagnetic Absorption Phenomena Induced by Paraelectric and Peristaltic Electrohydrodynamic Effects of the One Atmosphere Uniform Glow Discharge Plasma", dated Jun. 1, 2001 to Nov. 30, 2003, pp. 1-25.

(Continued)

*Primary Examiner* — Galen Barefoot
(74) *Attorney, Agent, or Firm* — Harness, Dickey & Pierce, P.L.C.

(57) ABSTRACT

A flow control system and method especially well adapted for use on a Coanda surface. In one embodiment a plurality of plasma actuators are disposed over a Coanda surface of a wing of an aircraft. The actuators are selectively energized to either delay the onset of boundary layer flow separation from the Coanda surface, or to promote flow separation. One embodiment discloses using dual mode plasma actuators on a Coanda surface. The system and method is applicable to a wide variety of aerodynamic surfaces where control over the separation of a boundary layer flow over a trailing edge surface is desired.

21 Claims, 6 Drawing Sheets

OTHER PUBLICATIONS

Corke, T. C. et al. "Plasma Flapts And Slats: An Application of Weakly-Ionized Plasma Actuators", AIAA. Collection of Technical Papers, AIAA, US, No. Paper-AIAA-2004-2127, Jun. 28, 2004, 9 Pages, XP009114869.

Moreau, Eric. Airflow Control By Non-Thermal Plasma Actuators, Journal of Physics D. Applied Physics, IOP Publishing, Bristol, GB, vol. 40, No. 3, Feb. 7, 2007, pp. 605-636, XP020112117.

Extended European Search Report for corresponding Application No. 08156375.1-2422/1995171 dated Nov. 25, 2010.

Chan, Sammie; Zhang, Xin; and Gabriel, Steve. "The Attenuation of Cavity Tones Using Plasma Actuators", $11^{th}$ AIAAA/CEAS Aeroacoustics Conference, May 23-25, 2005, AIAA 2005-2802, pp. 1-14.

Mitchell, Douglas A. "Control of High Speed Cavity Flow Using Plasma Actuators", Thesis, The Ohio State University, Department of Mechanical Engineering Honors Theses, May 2006, pp. 1-63.

* cited by examiner

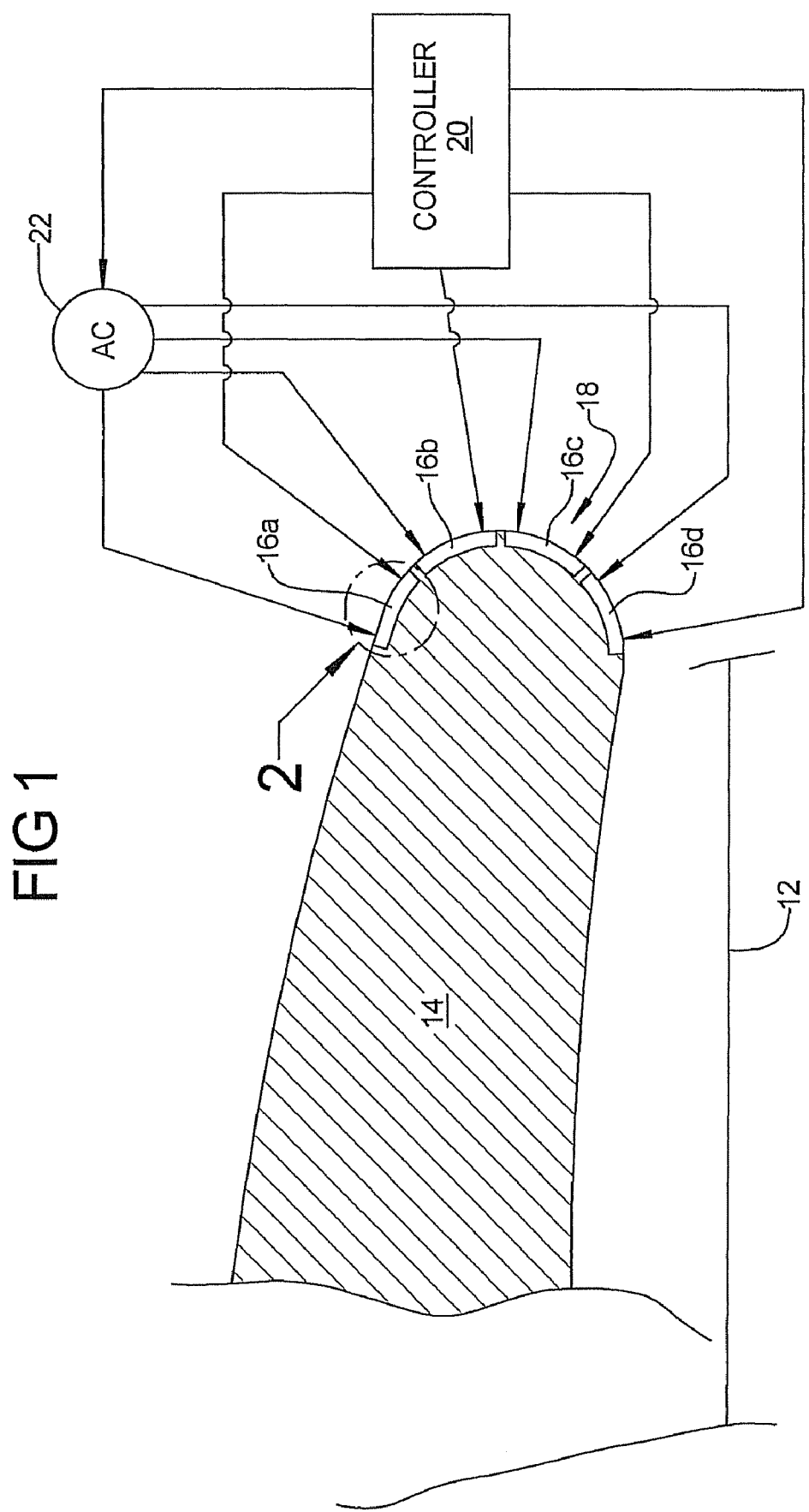

NONE OF PLASMA ACTUATORS 16a, 16b, 16c AND 16d ENERGIZED $\Delta C_L, \Delta C_m = 0$ PLASMA ACTUATORS 16c AND 16d ENERGIZED; ACTUATORS 16a AND 16b DE-ENERGIZED $-\Delta C_L, +\Delta C_m$ PLASMA ACTUATORS 16a AND 16b ENERGIZED; ACTUATORS 16c and 16d DE-ENERGIZED ALL OF PLASMA ACTUATORS 16a, 16b, 16c AND 16d ENERGIZED

FIG 8
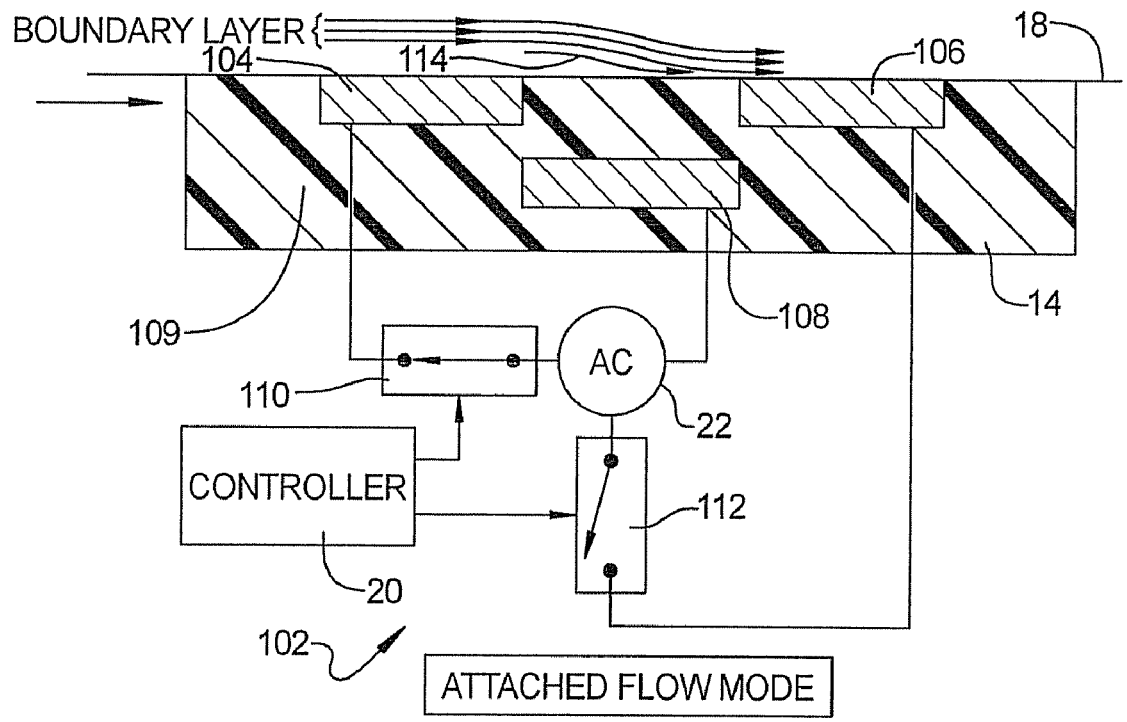
ATTACHED FLOW MODE
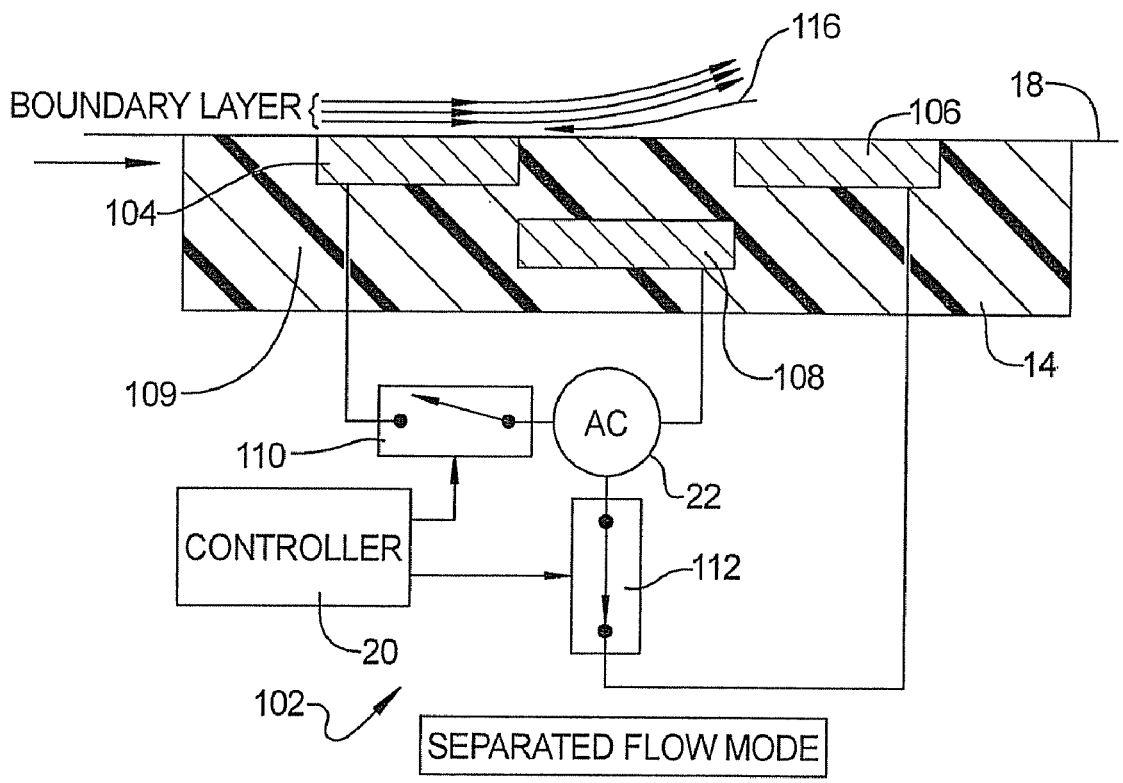
SEPARATED FLOW MODE
FIG 9

«AIRFOIL TRAILING EDGE PLASMA FLOW CONTROL APPARATUS AND METHOD»

CROSS-REFERENCE TO RELATED APPLICATIONS

This application is related in general subject matter to U.S. application Ser. No. 11/753,876, filed May 25, 2007, and U.S. application Ser. No. 11/753,869, filed May 25, 2007, both of which are incorporated herein by reference.

The present disclosure is also related in general subject matter to U.S. application Ser. No. 11/403,252, filed Apr. 12, 2006, assigned to The Boeing Company.

The disclosure of each of the above applications is hereby incorporated by reference into the present disclosure.

FIELD

The present disclosure relates to plasma flow actuators, and more particularly to a flow control system and method incorporating plasma flow actuators applied to a Coanda surface to modify a boundary layer flow over the Coanda surface.

BACKGROUND

The statements in this section merely provide background information related to the present disclosure and may not constitute prior art.

To be aerodynamically efficient, airborne mobile platforms, for example aircraft, should have highly integrated configurations that combine good performance, useful payload, and good stability and control characteristics. To achieve this objective, mobile platform configurations should have efficient, effective, and robust control effector suites. Removing conventional control surfaces offers the benefit of improved aerodynamic and structural efficiency but can degrade air vehicle stability and control. This is especially true of tailless aircraft configurations, for which hingeless yaw control concepts have been difficult to implement to date.

Pneumatically-actuated circulation control devices provide aerodynamic control potential similar to conventional moving controls but require a supply of high-pressure air to the actuators. This can necessitate bulky, heavy and hot supply infrastructure which is difficult to package in many portions of an airborne mobile platform. Electrically actuated acoustic control devices rely on harmonic excitation to alter the boundary layer. The harmonic excitation is generated using devices similar to a speaker, which includes moving parts. However, in mobile platform design, there is an interest in decreasing the number of moving parts associated with the various and numerous subsystems that the platform typically employs.

SUMMARY

The present disclosure is directed to a flow control system and method that is especially well adapted for using in connection with a Coanda surface. In one implementation a flow control method for an airborne mobile platform is disclosed that involves arranging a plasma actuator on a trailing edge surface of the mobile platform. A voltage is applied to the plasma actuator and controlled to ionize air in a vicinity of the plasma actuator adjacent to the trailing edge. This causes an induced flow that operates to influence at least one of attachment or separation of a boundary layer flow over the trailing edge surface. In one specific implementation a controller is used to control the application of the voltage to the plasma actuator, and the voltage is an alternating current (AC) voltage of at least about 3000 volts.

In variations of the above implementation a plurality of plasma actuators are disposed on the trailing edge surface. The trailing edge surface may form a Coanda surface. The plasma actuators may be selectively energized to influence the boundary layer flow over the Coanda surface to delay separation of the boundary layer from the Coanda surface, or to cause separation of the boundary layer.

In one embodiment a flight control system is disclosed that makes use of at least one plasma actuator disposed on a first portion of a Coanda surface of a mobile platform, and a second plasma actuator disposed on a second portion of the Coanda surface. A voltage source is used to selectively energize the plasma actuators. By selectively energizing the plasma actuators, the energized actuator(s) can cause ionization of air in its vicinity. This induces a fluid flow in a specific direction over the Coanda surface that either helps to delay separation of a boundary layer flow over the Coanda surface, or helps to promote separation of the boundary layer from the Coanda surface.

In one embodiment an aircraft is disclosed that makes use of a flight control system having at least one plasma actuator disposed on a Coanda surface of the aircraft. A voltage source is used to selectively energize the plasma actuator to influence flow of the boundary layer over the Coanda surface.

In another embodiment a plurality of dual mode plasma actuators are employed on a surface where control over separation and attachment of a boundary layer is needed.

BRIEF DESCRIPTION OF THE DRAWINGS

The drawings described herein are for illustration purposes only and are not intended to limit the scope of the present disclosure in any way.

FIG. 1 is a side view of one exemplary embodiment of a flight control system being employed on a Coanda surface of a wing of an aircraft, where the system makes use of a plurality of plasma actuators that are positioned over the Coanda surface;

FIG. 8 illustrates in greater detail one of the dual mode plasma actuators circled in FIG. 7, with its first and third electrodes connected across the AC voltage source to induce a flow that helps to delay boundary layer separation; and FIG. 9 illustrates the dual mode plasma actuator of FIG. 8 but with the second and third electrodes connected across the AC voltage source to induce a flow that serves to promote boundary layer flow in the opposite direction.

DETAILED DESCRIPTION

The following description is merely exemplary in nature and is not intended to limit the present disclosure, application, or uses.

Referring to FIG. 1, there is shown a flow control system 10 used on a wing 14 of a mobile platform 12. In this example the mobile platform 12 is an aircraft, and for convenience will be referenced throughout the following discussion as "aircraft 12". It will be appreciated immediately, however, that the teachings of the present disclosure are not limited to use with only airborne mobile platforms employing wings, such as commercial and military aircraft, but are readily applicable to unmanned air vehicles (UAVs), missiles, rotorcraft, land vehicles and even high speed marine vessels.

Figure 1A:
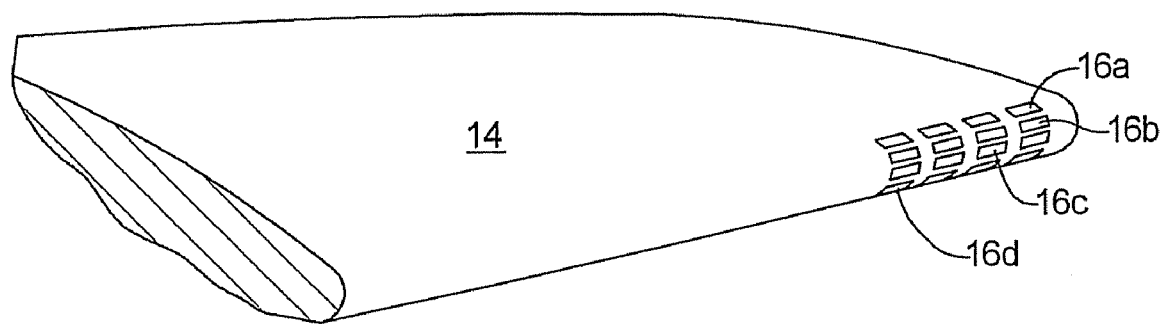
FIG. 1A shows a perspective view of a portion of the wing of FIG. 1 employing a plurality of spaced apart rows of the plasma actuators shown in FIG. 1.

In FIG. 1 the system 10 employs a plurality of plasma actuators 16 that are spaced apart along a Coanda surface 18 of the wing 14. While only four plasma actuators 16 are shown, a greater or lesser plurality could be employed to meet the needs of a specific application. In this example, two plasma actuators 16a, 16b are provided on a top half portion of the Coanda surface 18 while two additional plasma actuators 16c, 16d are provided on a bottom half portion of the Coanda surface. It will be appreciated that the Coanda surface 18 need not be associated with an aircraft wing, but instead could be associated with any component, for example a rear spoiler of a land vehicle. If the plasma actuators are incorporated on a vertical tail of an aircraft or other form of mobile platform, then it will be appreciated that the references to "top half" and "bottom half" may instead be termed "port side half" and "starboard side half". Also, in practice, it is anticipated that many applications may require a plurality of each of the actuators 16a, 16b, 16c and 16d to be spaced apart in a span-wise direction along the wing 14 or other form of aerodynamic surface. An example of this arrangement is illustrated in FIG. 1A. The precise placement of the plasma actuators 16 may be varied as needed to meet a specific application. Fox example, arrangements of the plasma actuators 16 are also possible where the actuators are arranged with their long axes cordwise, with many of the actuators arrayed along a wingspan to facilitate separation control with coherent vorticity.

A controller 20 and a high voltage alternating current (AC) voltage source 22 are in communication with each plasma actuator 16. The controller 22 independently controls the application of a high voltage signal, preferably between about 3,000 VAC up to about 20,000 VAC, or possibly even higher, to each plasma actuator 16. Energizing any one of the plasma actuators 16 causes the actuator to ionize air in its vicinity adjacent the outer surface portion 18a of the Coanda surface 18. An electric field is also created that is directly proportional to the magnitude of the AC voltage being applied. The electric field acts on the ionized air to create an induced flow over the energized plasma actuator 16 that tends to draw the boundary layer toward the Coanda surface 18 as it moves over the Coanda surface. This helps to delay separation of the boundary layer from the Coanda surface 18.

Figure 2:
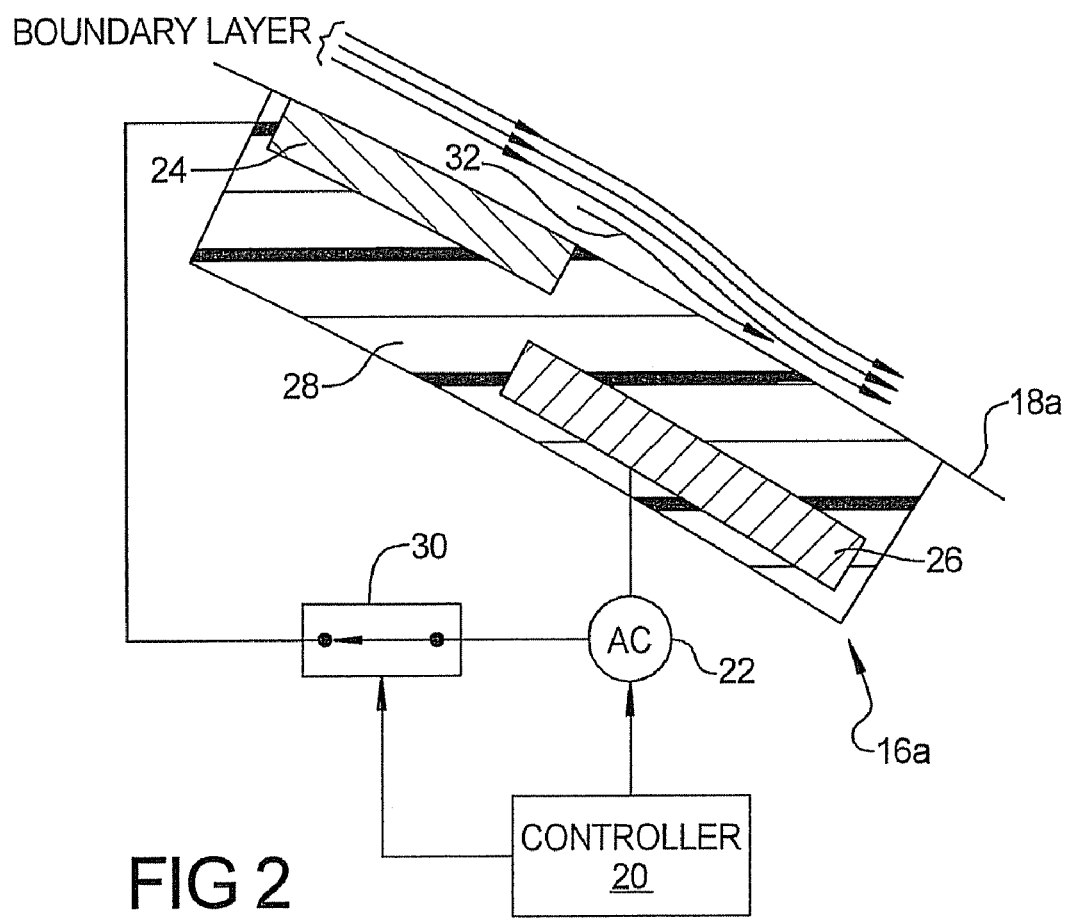
FIG. 2 is an enlarged side view of one of the plasma actuators shown in FIG. 1.

Referring to FIG. 2, one of the plasma actuators 16a is shown in greater detail. This form of actuator is also discussed in co-pending U.S. application Ser. No. 11/403,252, filed Apr. 12, 2006, and assigned to The Boeing Company, which has been incorporated herein by reference. In brief, however, the plasma actuator 16a includes a first electrode 24 and a second electrode 26 separated by a dielectric material 28. The dielectric material 28 may form a distinct layer that is disposed between the electrodes 24 and 26 and that encapsulates the electrodes 24 and 26, as shown in FIG. 2. Preferably the electrodes 24 and 26 are recess mounted in the outer surface 18a of the Coanda surface 18 so as not to interfere with its smooth surface contour. However, mounting of at least the first electrode 24 directly on the Coanda surface is also possible. If mounted directly on the Coanda surface 18, then the first electrode 24 would typically not be completely encapsulated by the dielectric material 28. The plasma actuators 16 are further each arranged on the Coanda surface 18 such that the second electrode 26 is positioned downstream, relative to the direction of the boundary layer flow, of the first electrode 24.

The AC voltage source 22 is coupled between the controller 20 and the second electrode 26. A switch 30 is interposed between the AC voltage source 22 and the first electrode 24. The switch 30 may be a semiconductor switch, or it may be an electromechanical switch that is actuated by a suitable electrical signal. Essentially any form of switch may be used that meets the needs of a specific application.

When the controller 20 closes the switch 30, the high voltage AC signal applied across the electrodes 24 and 26 (typically at least about 3,000 VAC) causes air in the vicinity of the electrodes 24 and 26, and closely adjacent the outer surface 18a of the Coanda surface 18, to be ionized. An electric field is also created between the electrodes 24 and 26. The electric field acts on the ionized air to induce a flow 32 closely adjacent the outer surface 18a that moves from the first electrode 24, over the outer surface 18a, and over the second electrode 26. The induced flow 32 serves to draw the boundary layer flow down against the outer surface 18a, which helps to delay the onset of boundary layer separation from the Coanda surface 18.

The particulars of the construction of the electrodes 24 and 26 may vary considerably to meet the needs of a particular application. The electrodes 24 and 26 may be formed from any conductive material. Copper is one material that is particularly suitable. The electrodes 24 and 26 may be formed as thin strips, possibly as foil strips, and may have a typical thickness on the order of about 0.001-0.005 inch (0.0254-0.127 mm). The length and width of each electrode 24 and 26 may vary as needed to suit specific applications, but it is anticipated that in many aircraft applications, the dimensions of each electrode may typically be on the order of 1-20 inches (2.54 cm-50.08 cm) for the length and 0.12-0.20 inch (3-5 mm) for the width. The dielectric material 28 may comprise any suitable dielectric material, for example quartz, KAPTON®, or TEFLON® dielectric material. Other dielectric materials may also be suitable for use, and the precise dielectric material used may be dictated by the needs of a specific application. Preferably, the dielectric material 28 provides a thickness layer of about 0.005-1.0 inch (0.127-25.4 mm) between the first and second electrodes 24 and 26, respectively.

Figure 3:
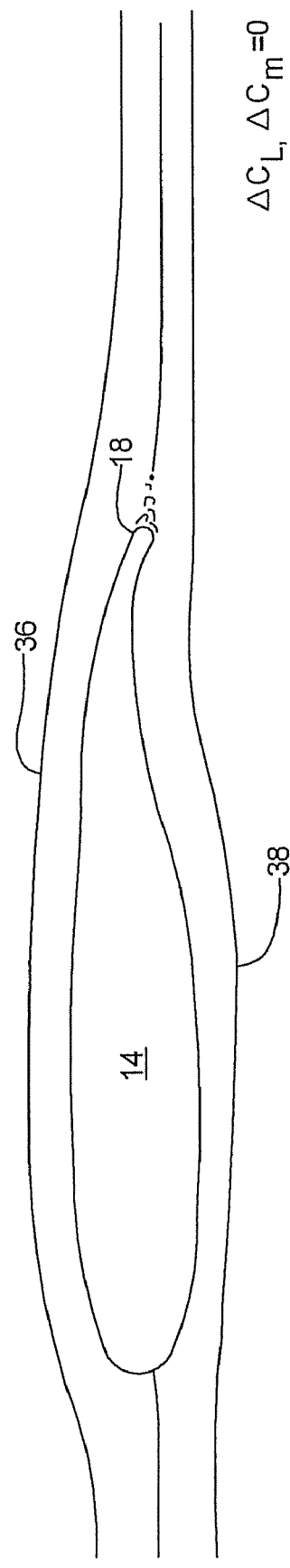
FIG. 3 is a side view of the wing of FIG. 1 illustrating how the boundary layer flow appears with none of the plasma actuators actuated.

Referring now to FIGS. 3-6, the influence on the boundary layer flow that is provided by selectively energizing various ones of the plasma actuators 16 will be described. Referring first to FIG. 3, the upper and lower surface streamlines 36 and 38 are shown moving over the Coanda surface 18 while none of the plasma actuators 16 (not visible) are energized. In this Figure the incremental lift coefficient induced by the system 10 ($\Delta C_L$) equals the incremental pitching moment coefficient induced by the system ($\Delta C_M$), and both are zero.

Figure 4:
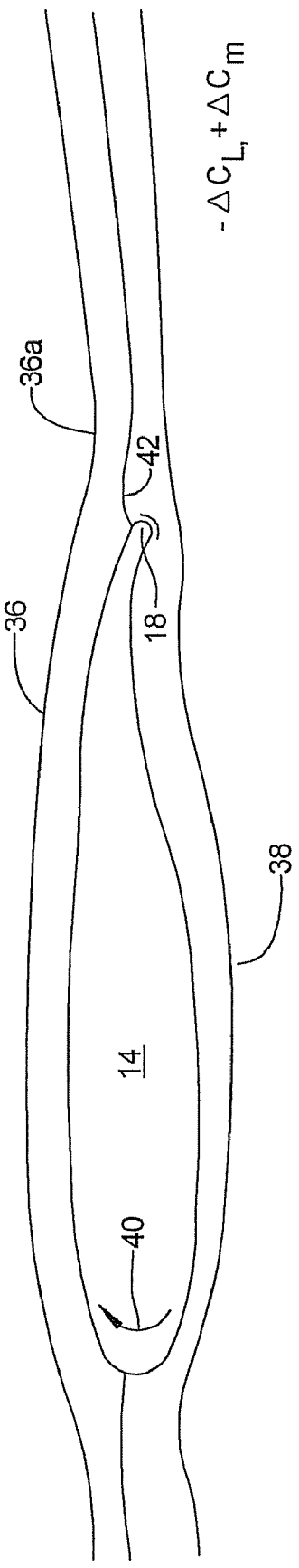
FIG. 4 shows the wing of FIG. 1 but with at least one of the plasma actuators on only the lower surface being energized, with the resulting change in the boundary layer flow along the Coanda surface and associated modification of circulation and streamlines about the wing section (i.e., causing the wake flow to be deflected upwardly)

In FIG. 4 plasma actuators 16c and 16d on the lower half of the Coanda surface 18 have been energized, while actuators 16a and 16b on the upper half are de-energized. This creates a negative lift coefficient ($\Delta C_L$) and a positive pitching moment (+$\Delta C_M$) directed in accordance with arrow 40. Streamline 42 indicates how actuators 16c and 16d have modified the boundary layer flow slightly to alter its separation from the Coanda surface 18. Note the portion 36a of streamline 36 is slightly more elevated than what appears in FIG. 3.

Figure 5:
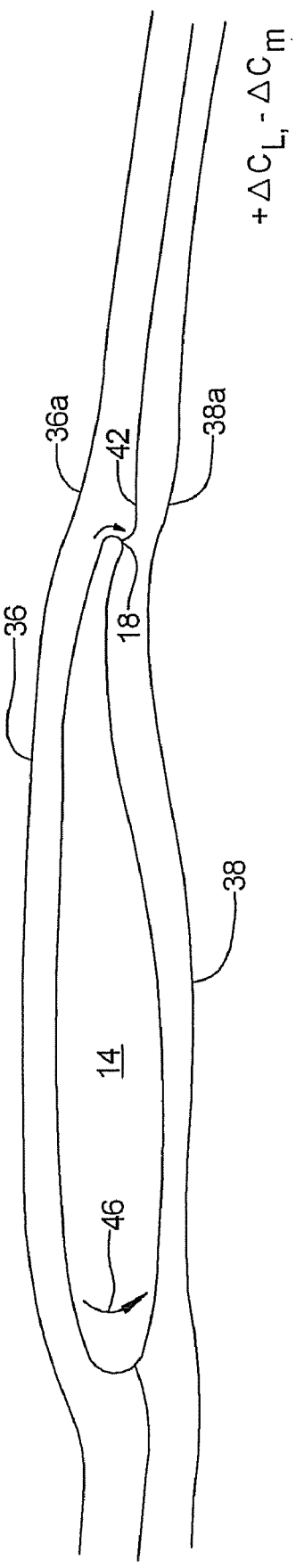
FIG. 5 shows the wing of FIG. 1 but with at least one plasma actuator on only the upper surface being energized, with the resulting change in the boundary layer flow along the Coanda surface and associated modification of circulation and streamlines about the wing section (i.e., causing the wake flow to be deflected downwardly)

Referring to FIG. 5, the plasma actuators 16a and 16b are energized while actuators 16c and 16d are de-energized. This creates a positive lift coefficient (+$\Delta C_L$) and a negative pitching moment ($-\Delta C_M$) (denoted by streamline arrow 46). The streamline 42 indicates that the plasma actuators 16a and 16b have delayed the onset of boundary layer separation, and streamlines 36a and 38a have been modified to be directed downwardly slightly.

Figure 6:
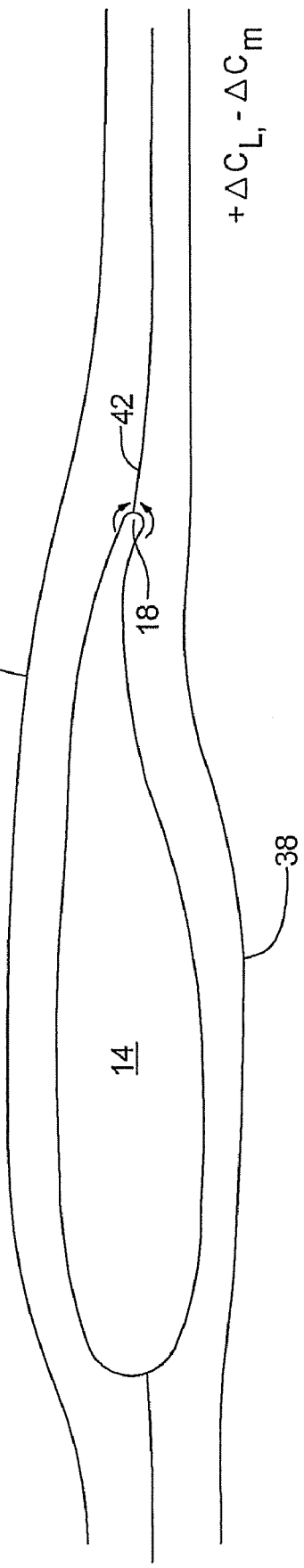
FIG. 6 is a view of the wing of FIG. 1 showing the boundary layer flow leaving the wing when at least one actuator on both of the upper surface and the lower surface is actuated (i.e., no significant change to the wake flow)

FIG. 6 illustrates the flow effect with all of the plasma actuators 16 energized. In this example the wake separation is reduced, thus reducing the drag on the wing 14 but without altering the pitching moment or lift.

Applications of the system 10 are numerous, including commercial and military aircraft, unmanned air vehicles (UAVs) and missiles. Benefits will also be realized on various aerodynamic surfaces of motor land vehicles such as cars and trucks.

The system 10 provides hingeless yaw control for tailless aircraft by generating asymmetric drag. Asymmetric drag is created by controlling separation in the circulation control airfoil wake or inducing spanwise alteration between positive and negative circulation increments that produce increased induced drag without accompanying lift or pitching moment change.

The system 10 enables hingeless aerodynamic control to increase aerodynamic and structural efficiency. Aerodynamic efficiency is improved by elimination of elevon edge and hingeline gaps on wings and like aerodynamic surfaces. Structural efficiency is improved by increasing torque box size which decreases weight, eliminates mechanical actuation weight and complexity, and increases wing internal volume for fuel, etc.

The system 10 can simplify high-lift systems for aircraft (especially commercial transports with highly complex multi-element flaps) to increase low-speed performance while reducing cost, weight and complexity. The system 10 can potentially be used to replace trim tabs on commercial aircraft rudders or elevators, eliminating mechanical complexity of a secondary moving surface on the primary control surface. Use of the system 10 may produce higher control rates (high bandwidth controller) than conventional moving surface effectors since the system 10 is constrained only by the convective speed of the freestream fluid flow and not the mechanical motion of the flap effector. This enables control of more highly unstable airframes, increasing agility and performance. The system 10 described herein enables low-cost, reduced-complexity wing designs, which are especially useful for thin, deployable wings (missiles or small UAVs) where control surfaces are difficult to integrate using conventional approaches because of control actuation installation difficulty. Other applications are possible on non-flying vehicles, such as semi-trailer aero-braking assist by deactivating actuation meant to reduce trailer base drag, or traction control by inducing a downward force when a Coanda surface is installed along a trailer base perimeter.

The system 10 is also expected to Increase mission flight time or range as a result of providing a more efficient means (structurally and aerodynamically speaking) to control an airborne mobile platform. Additional design flexibility is also enabled by new mechanizations of control devices, especially for tailless aircraft or air vehicles with deployable aero-surfaces. Increased control actuation rates may also be realized together with reduced overall complexity.

Figure 7:
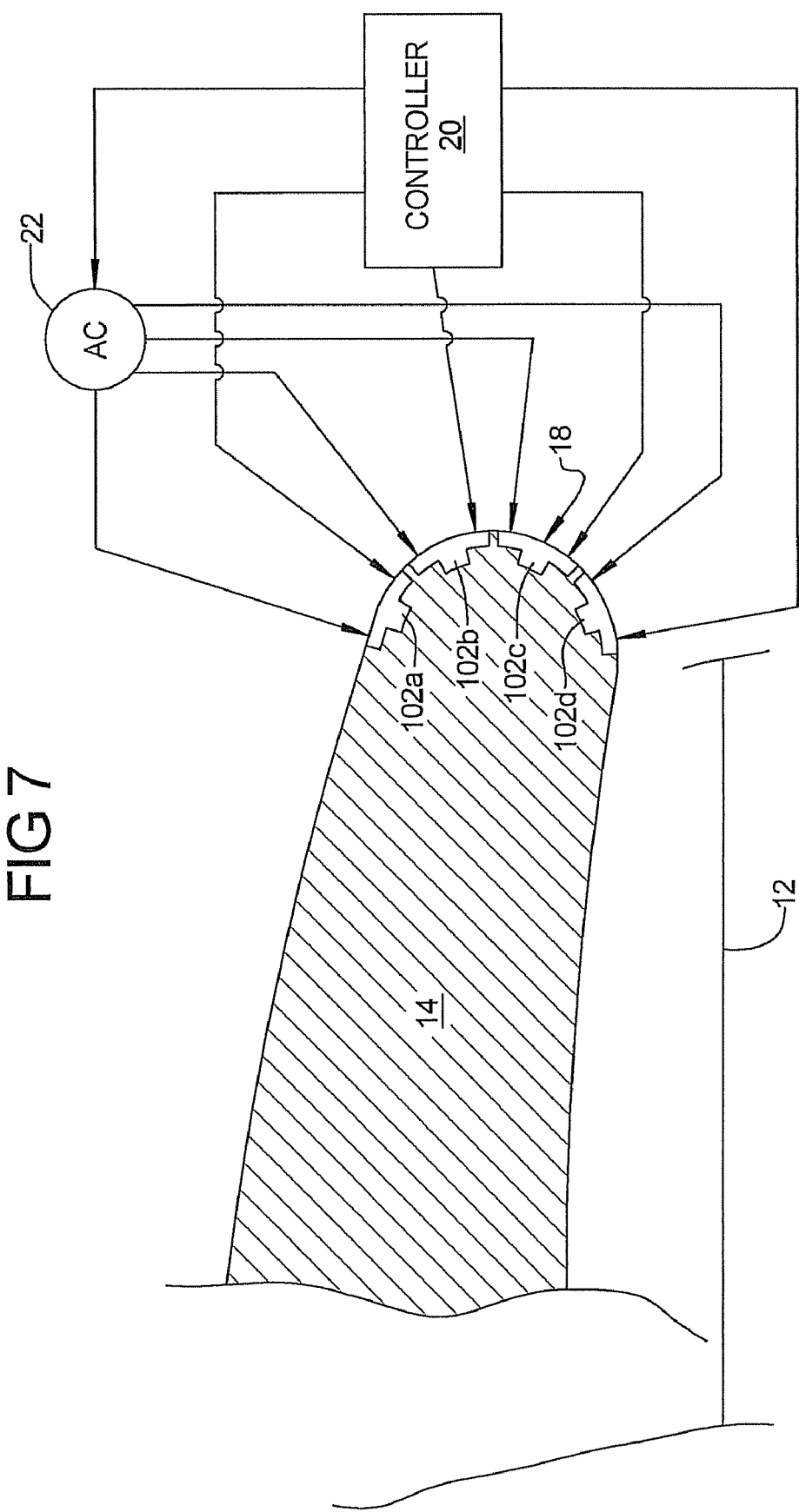
FIG. 7 illustrates how a plurality of dual mode plasma actuators may be employed on a Coanda surface.

Referring to FIG. 7, another system 100 of the present disclosure is illustrated that makes use of a plurality of dual mode plasma actuators 102 integrated into the Coanda surface 18 of the wing 14. This system 100 is identical to the system 10 of FIGS. 1 and 1A with the exception of the use of dual mode actuators 102. The dual mode plasma actuators 102 are discussed in detail in co-pending application Ser. No. 11/753,876, filed May 25, 2007, which has been incorporated by reference into the present application. In this example a pair of the dual mode plasma actuators 102a and 102b is disposed on the upper half of the Coanda surface 18 of the wing 14. A second pair of actuators 102c and 102d is disposed on the lower half. As with the system 10 described in connection with FIG. 1, a plurality of the dual mode plasma actuators 102 may be spaced apart, span-wise, along the Coanda surface 18. The precise number, spacing and arrangement of the dual mode plasma actuators 102 employed will vary to meet the needs of a specific application.

Referring to FIGS. 8 and 9, the dual mode plasma actuators 102 are similar to the plasma actuators 16, but include three electrodes 104, 106 and 108 rather than two electrodes. Two switches 110 and 112 enable the AC voltage source 26 to be applied across either the first and second electrode pair 104 and 108, or between the second and third electrode pair 106 and 108. The third electrode 108 is separated by a suitable dielectric material layer 109, or encased in a suitable dielectric material.

When the AC voltage from the AC voltage source 26 is applied across electrode pair 104 and 108 by closing switch 110 and opening switch 112, the plasma actuator 102 operates in the same manner as described for actuator 16; that is, an induced fluid flow 114 is created (FIG. 8). The direction of the induced flow 114 is the same as that of the boundary layer flow flowing over the actuator 102. As with plasma actuator 16, the induced fluid flow 114 acts on the boundary layer flow to help prevent separation of the boundary layer flow from the Coanda surface 18. However, when electrode pair 106 and 108 is energized by closing switch 112 and opening switch 110, an induced flow 116 is created that is in the direction opposite to that of induced flow 114 (FIG. 9). In this instance the induced flow 116 helps to promote attachment of the boundary layer further around the trailing edge of the Coanda surface 18 when operated in concert with the plasma actuator on the other half of the Coanda surface.

The system 100 provides an added degree of flow control flexibility because various ones of the plasma actuators 102 can have different pairs of electrodes 104,106,108 energized to even more significantly affect the boundary layer flow (i.e., either more significantly promote attachment or separation of the boundary layer flow). For example, certain of the plasma actuators 102, for example those located on the top half of the Coanda surface 18, can be energized to create the induced flow 114 (to promote boundary layer attachment), while other ones of the actuators 102 located on the bottom half of the Coanda surface 18 can be energized to produce induced flow 116 (to enhance the turning of the flow around the Coanda surface 18). The overall result in this specific example is that all of the plasma actuators 102 would be working to even more significantly move the trailing edge stagnation point around the Coanda surface 18. The controller 20 may control the energization of specific electrode pairs 104,108 or 106, 108 of the plasma actuators 102 as needed so that it produces a nose-up or nose-down moment on the surface where the system 100 is employed.

Thus, the system 100 provides an even further enhanced range of aerodynamic flow control possibilities. It should also be appreciated that various combinations of plasma actuators 16 and 102 could be used on a surface, for example Coanda surface 18, to even further enhance control over the separation and/or attachment of the boundary layer.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A flow control method for a mobile platform, comprising:
   arranging at least one plasma actuator on a trailing edge surface of a portion of a mobile platform;
   applying a voltage to said plasma actuator; and
   controlling said voltage to said plasma actuator to ionize air in a vicinity of said plasma actuator adjacent to said trailing edge surface, the ionized air causing an induced flow that flows in a desired direction adjacent the trailing edge surface, and which operates to selectively influence at least one of attachment or separation of a boundary layer flow over said trailing edge surface depending on a direction that the induced flow is caused to flow.

2. The method of claim 1, wherein arranging at least one plasma actuator comprises arranging a single mode plasma actuator on said trailing edge surface.

3. The method of claim 1, wherein arranging at least one plasma actuator comprises arranging a dual mode plasma actuator on said trailing edge surface.

4. The method of claim 1, wherein arranging at least one plasma actuator on a trailing edge surface comprises arranging a plasma actuator on an upper half of a Coanda surface.

5. The method of claim 1, wherein arranging at least one plasma actuator on a trailing edge surface comprises:
   arranging a plasma actuator on a lower half of a Coanda surface.

6. The method of claim 1, wherein arranging at least one plasma actuator on a trailing edge surface comprises:
   arranging a first plasma actuator on an upper half of a Coanda surface;
   arranging a second plasma actuator on a lower half of a Coanda surface; and
   controlling a voltage applied to each said plasma actuator to influence said boundary layer flow over said Coanda surface.

7. The method of claim 1, further comprising:
   using a controller to control actuation of said plasma actuator.

8. The method of claim 1, wherein applying a voltage to said plasma actuator comprises applying an alternating current (AC) voltage of at least about 3,000 volts to said plasma actuator.

9. The method of claim 6, further comprising using a controller to independently control the application of said voltage to said first and second plasma actuators.

10. A flight control method for an airborne mobile platform, comprising:
    arranging a first plasma actuator on a first portion of a Coanda surface of said mobile platform;
    arranging a second plasma actuator on a second portion of a Coanda surface of said mobile platform;
    selectively applying a voltage to one of said first and second plasma actuators to energize said one actuator and cause ionization of air in a vicinity of said one actuator, said ionization of air inducing a fluid flow in a desired direction over the Coanda surface adjacent said one actuator that influences a path of flow of said boundary layer over said one actuator to facilitate one of attachment or separation of said boundary layer depending on a direction that said fluid flow is caused to flow.

11. The flight control method of claim 10, wherein:
    arranging said first plasma actuator on said first portion of said Coanda surface comprises arranging said first plasma actuator on an upper half of said Coanda surface; and
    arranging said first plasma actuator on said second portion of said Coanda surface comprises arranging said second plasma actuator on a lower half of said Coanda surface.

12. The method of claim 10, wherein selectively applying a voltage comprises selectively applying an alternating current (AC) voltage of at least about 3,000 volts to said one actuator.

13. The method of claim 10, further comprising applying said voltage to both of said first and second plasma actuators simultaneously.

14. The method of claim 10, wherein applying a voltage to a selected one of said first and second plasma actuators comprises using a controller to selectively apply said voltage.

15. The method of claim 10, further comprising arranging a plurality of said first plasma actuators on said first portion of said Coanda surface, and a plurality of said second plasma actuators on said second portion of said Coanda surface.

16. A flow control system for influencing a boundary layer flowing over a Coanda surface, the system comprising:
    at least one plasma actuator disposed on said Coanda surface;
    a voltage source for applying a voltage to said plasma actuator sufficiently high to cause said plasma actuator to ionize air in a vicinity of said plasma actuator, said ionization of air creating an induced flow in a desired direction over the Coanda surface which influences a boundary layer flow over said Coanda surface to enhance one of attachment or separation of said boundary layer flow depending on a direction that said induced flow is caused to take.

17. The flow control system of claim 16, further comprising a controller for controlling the application of said voltage to said plasma actuator.

18. The flow control system of claim 17, further comprising a plurality of plasma actuators disposed in spaced apart relation to one another over said Coanda surface; and
    wherein said voltage source is applied to selected ones of said plasma actuators by said controller to help delay separation of said boundary layer flow from said Coanda surface or to accelerate separation of said boundary layer flow from said Coanda surface.

19. The flow control system of claim 16, wherein said voltage source comprises an AC voltage of at least about 3,000 volts.

20. An aircraft comprising:
a flow control system for influencing a boundary layer flowing over a Coanda surface of the aircraft, the system comprising:
at least one plasma actuator disposed on said Coanda surface;
a voltage source for applying a voltage to said plasma actuator sufficiently high to cause said plasma actuator to ionize air in a vicinity of said plasma actuator, said ionization of air creating a flow in a desired direction to influence a boundary layer flow over said Coanda surface to enhance one of attachment or separation of said boundary layer flow depending on a direction that said induced flow is caused to take.

21. A flow control method for a mobile platform, comprising:
arranging at least one plasma actuator on a trailing edge surface of a portion of a mobile platform;
applying a voltage to said plasma actuator; and
controlling said voltage to said plasma actuator to ionize air in a vicinity of said plasma actuator adjacent to said trailing edge surface, to cause an induced flow, and without heating said air in said vicinity of said plasma actuator, and such that said induced flow flows in either one of two opposing directions adjacent the trailing edge surface and which operates to selectively influence both attachment and separation of a boundary layer flow over said trailing edge surface depending on a direction that the induced flow is caused to flow.

* * * * *